United States Patent Office 3,462,435
Patented Aug. 19, 1969

1

3,462,435
ALKYLENEIMINOQUINAZOLINE-2,4-DIONES
Richard H. Fish, Anaheim, Calif., assignor to United States Borax & Chemical Corporation, Los Angeles, Calif., a corporation of Nevada
No Drawing. Filed Nov. 15, 1966, Ser. No. 594,407
Int. Cl. C07d 51/48, 57/00; A01n 9/22
U.S. Cl. 260—256.4                    5 Claims

ABSTRACT OF THE DISCLOSURE

The invention comprises novel 3-alkyleneiminoquinazoline-2,4-dione compounds in which the alkylene group has 4 to 7 carbon atoms. The compounds which are especially useful as herbicides, can be prepared by cyclization of the corresponding uramidobenzoate.

---

This invention relates to novel quinazoline-2,4-dione compounds and more particularly it relates to novel 3-alkyleneiminoquinazoline-2,4-dione compounds and herbicidal compositions and methods utilizing said compounds.

According to the present invention there are provided novel compounds of the formula

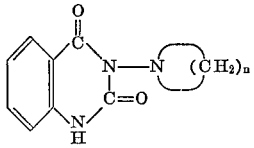

in which $n$ is an integer of from about 4 to about 7, inclusive. Thus, the compounds are 3-alkyleneiminoquinazoline-2,4-diones in which the alkylene group has from about 4 to about 7 carbon atoms.

The compounds of the present invention are generally crystalline solids which are soluble in organic solvents such as alcohols and dioxane.

The compounds are readily prepared by cyclization of an ester of the corresponding 2-(ω-alkyleneiminouramido) benzoate, such as by heating in the presence of a mineral acid or a base. The reaction can be illustrated by the following equation:

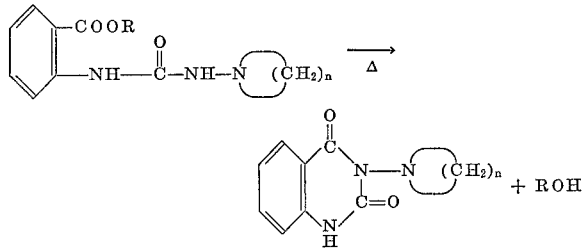

in which R is preferably an alkyl group, such as lower alkyl, and $n$ is an integer of from about 4 to about 7, inclusive.

A facile procedure for producing the compounds is merely to reflux the corresponding uramidobenzoate in an alcoholic hydrochloric acid or basic solution. The product is isolated by removal of the solvent and can be purified by conventional procedures, such as recrystallization, as from ethanol.

The uramidobenzoates are readily prepared by reaction of an ester of anthranilic acid with the N-aminoalkyleneimine. The anthranilate is first converted to the corresponding isocyanate by reaction with phosgene and then reacted with the N-aminoalkyleneimine to give the desired uramidobenzoate.

2

The method of preparation can be illustrated by the following equation in which $n$ and R have the significance previously assigned.

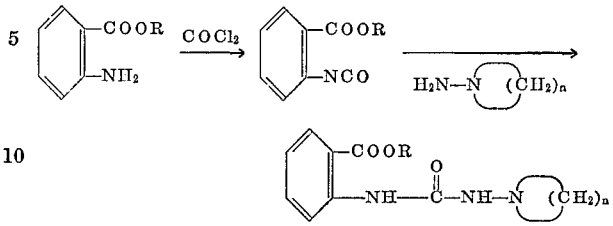

The anthranilate, preferably as the hydrochloride, is reacted with phosgene to give the isocyanate. This reaction takes place in a relatively high boiling solvent, such as toluene, xylene, isooctane, or the like. The resultant isocyanate is isolated by distillation and then reacted with N-aminoalkyleneimine in the presence of an inert solvent, such as the hydrocarbons, to give the desired uramidobenzoate. The uramidobenzoate is isolated and purified by conventional procedures, such as recrystallization from a hydrocarbon.

Reference is made to a copending application of Don L. Hunter, Kiyoshi Kitasaki and Robert F. Crawford, Ser. No. 594,353, filed on even date herewith, which describes and claims preparation of the uramidobenzoate compounds and is assigned to the assignee of the present application.

The following examples are presented to illustrate the preparation of typical compounds of the invention but the invention is not to be considered restricted to the specific examples given. The first example also shows a typical preparation of the intermediate uramidobenzoate.

EXAMPLE I

Methyl 2-isocyanatobenzoate

In a 5-liter, three-necked flask equipped with a gas inlet tube, stirrer and a reflux condenser connected to a water scrubber, was added 200 grams (1.32 moles) of methyl anthranilate dissolved in three liters of isooctane (commercial grade). Dry hydrogen chloride was passed into the isooctane solution of methyl anthranilate for 7 hours and a thick white precipitate was formed. The mixture was refluxed and phosgene was passed in at a rapid rate for 7 hours. The reaction mixture was then cooled and the insoluble precipitate was removed by filtration. The isooctane was removed at reduced pressure and the remaining residue was distilled to give 178.4 grams (76.2%) of product, B.P. 145°–146° C./16 mm.

Methyl 2-(ω-hexamethyleneiminouramido)benzoate

In a flask equipped with a magnetic stirring bar, dropping funnel and a reflux condenser was added 8.86 grams (0.05 mole) of methyl 2-isocyanatobenzoate dissolved in 50 ml. of benzene. To this stirring solution was added 5.71 grams (0.05 mole) of N-aminohexamethyleneimine dissolved in 50 ml. of benzene. The reaction was slightly exothermic and after addition was complete the reaction mixture was refluxed for 4.5 hours. The reaction mixture was then cooled and the solvent removed by distillation under vacuum. The remaining residue was dissolved in hot hexane and allowed to stand overnight. The crystals were filtered and dried to give 11.68 grams (80.2%), M.P. 103°–107° C. An analytical sample was was obtained by recrystallization from hexane, M.P. 105°–107° C.

3-hexamethyleneiminoquinazoline-2,4-dione

In a flask equipped with a magnetic stirring bar and a reflux condenser was added 7.1 grams (0.024 mole) of methyl 2-(ω-hexamethyleneiminouramido)benzoate in 100 ml. of a 1:1 solution of ethanol-hydrochloric acid. The reaction mixture was refluxed for 5 hours. The solvent was removed on a Rinco evaporator. The product was filtered and dried giving 1.6 grams (25%) of crystalline product which, after recrystallization from ethanol, melts at 196.5°–198° C.

EXAMPLE II 3-pentamethyleneiminoquinazoline-2,4-dione

To 5.0 grams (0.018 mole) of methyl 2-(ω-pentamethyleneiminouramido)benzoate was added 75 ml. of a 1:1 solution of ethanol-hydrochloric acid. The resultant mixture was refluxed for 4.5 hours and the solvent then removed by distillation under reduced pressure. The yellow residue was dissolved in hot 95% ethanol. Upon cooling, a crystalline solid separated and was isolated by filtration and dried to give 1.8 grams (43%) of product. After recrystallization from ethanol, the product melts at 252°–253° C.

EXAMPLE III 3-heptamethyleneiminoquinazoline-2,4-dione

In a similar manner, methyl 2-(ω-hepamethyleneiminouramido)benzoate was cyclized to give 3-heptamethyleneiminoquinazoline-2,4-dione, M.P. 184°–185.5° C.

EXAMPLE IV 3-tetramethyleneiminoquinazoline-2,4-dione

In a similar manner, methyl 2-(ω-tetramethyleneiminouramido)benzoate was cyclized to give 3-tetramethyleneiminoquinazoline-2,4-dione as the hydrochloride salt, M.P. 235°–237° C. The free base melts at 237°–238° C.

The quinazolinedione compounds of this invention are effective herbicidal compounds useful for controlling weed growth. "Weeds" as used herein is intended to include any plant growth which is undesirable. The compounds are useful as a pre-emergence or post-emergence treatment; that is, they can be used to kill or suppress the growth of plants or to kill or prevent the emergence of seedlings of unwanted plants. Thus, the compounds can be used to control the growth of weeds by applying a phytotoxic amount to the locus of the weeds, that is, the foliage of the growing plants or soil in which the weeds are growing or will grow.

Generally an application rate of from 0.1 to about 25 pounds of one or more of the active compounds per acre is an effective phytotoxic amount, although greater or lesser amounts can be used if desired. The previously preferred application rate is in the range of from about 1 to about 15 pounds per acre. At lower application rates the compounds exhibit selective activity and are especially useful for controlling weed growth in desirable crops such as corn, peanuts and cotton.

The following examples illustrate the herbicidal activity of representative compounds of this invention.

EXAMPLE V 3-hexamethyleneiminoquinazoline-2,4-dione was applied as a pre-emergence treatment in a methanol-dioxane solution at an application rate of 2.5 pounds per acre to mustard, ragweed, lamb's quarter, velvetleaf, watergrass, ryegrass, crabgrass, wild oats, and peanuts. Twenty-nine days after treatment, a complete kill or non-emergence of all plants was recorded, except for the peanuts which showed only slight growth inhibition.

EXAMPLE VI 3-pentamethyleneiminoquinazoline-2,4-dione was applied as a pre-emergence treatment in a methanol-dioxane solution at an application rate of 2.5 pounds per acre to velvetleaf, pigweed, lamb's quarter, ragweed, bindweed, mustard, foxtail, watergrass, ryegrass, crabgrass, Johnson grass, wild oats, peanuts, cotton, and corn. Twenty-nine days after treatment, a complete kill of all weeds was recorded and the crops peanuts, cotton and corn showed only slight injury.

EXAMPLE VII

3 - heptamethyleneiminoquinazoline - 2,4 - dione in a methanoldioxane solution was applied as a pre-emergence treatment at a rate of 4 pounds per acre to mustard, lamb's quarter, pigweed, crabgrass, peanuts, cotton, and corn. Thirty-three days after treatment, all weeds were substantially eradicated and the peanuts, cotton, and corn showed no injury.

EXAMPLE VIII 3-tetramethyleneiminoquinazoline-2,4-dione was the hydrochloride salt in a dioxane-methanol-$H_2O$ solution, was applied as a post-emergence treatment at a rate of 7.5 pounds per acre to millet, mustard, cucumbers, and beans. Thirty-six days after treatment, a complete kill of all plants was recorded.

Since a relatively small amount of one or more of the active quinazolinediones should be uniformly distributed over the area to be treated, the compounds preferably are formulated with conventional herbicide carriers or diluents, either liquid or solid. Thus, the compounds can be impregnated on or admixed with a pulverulent solid carrier such as lime, talc, clay, bentonite, calcium chloride, vermiculite, calcium carbonate, and the like. Alternatively, the compounds can be dissolved or suspended in a liquid carrrier such as water, kerosene, alcohols, diesel oil, xylene, benzene, glycols, and the like. A surfactant preferably is included to aid in dispersion, emulsification and coverage. The surfactant can be ionic or nonionic, and may be liquid or a solid. The use of the term "surfactant" herein is intended to include such compounds commonly referred to as wetting agents, dispersing agents and emulsifying agents. Typical surfactants include the alkylarylsulfonates, the fatty alcohol sulfates, sodium salt of naphthalenesulfonic acid, alkylaryl polyether alcohols, long chain quaternary ammonium compounds, sodium salts of petroleum-derived alkylsulfonic acids, polyoxyethylene-sorbitan monolaurate, and the like. These dispersing and wetting agents are sold under numerous trademarks and may either be pure compounds, mixtures of compounds of the same general group, or they may be mixtures of compounds of different classes. Surfactants can also be included in compositions containing a solid inert carrier.

Concentrated compositions containing the active agent which can be subsequently diluted, as with water, to the desired concentration for application to plants and soil are also provided. The advantages of such concentrates are that they are prepared by the manufacture in a form such that the user need only mix them with a locally available carrier, preferably water, thereby keeping shipping costs to a minimum while providing a product which can be used with a minimum of equipment and effort. Such concentrates may contain from about 5 to about 80 percent by weight of one or more of the active quinazolinediones with a carrier or diluent, which may be a solid or liquid. Liquid carriers which are miscible with the active agent or other liquids in which the compounds may be suspended or dispersed may be used. A surfactant is also generally included to facilitate such dilution or dispersion in water. However, the surfactant itself may comprise the carrier in such concentrates.

The herbicidal compositions can include other beneficial adjuvants, such as humectants, oils and contact agents. Also, other herbicides, such as the sodium borates, sodium chlorates, chlorophenoxyacetic acids, substituted ureas, uracils, triazines, halobenzoic acids, haloalkanoic acids, anilides, pyridinols, picolinic acids, and carbamates can be included in the formulation.

Reference is made to a copending application of Cecil W. LeFevre and Richard H. Fish, Ser. No. 594,411, filed on even date herewith, which describes and claims the use of the present compounds as herbicides and is assigned to the assignee of the present application.

Whereas the above description and examples illustrate many widely varied embodiments of the invention it will be apparent to one skilled in the art that many other embodiments and variations may be devised without departing from the spirit and scope thereof.

What is claimed is:
1. A compound of the formula

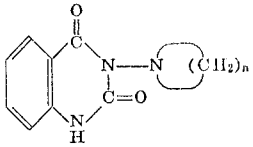

wherein $n$ is an integer of from 4 to 7, inclusive.

2. 3-pentamethyleneiminoquinazoline-2,4-dione.
3. 3-hexamethyleneiminoquinazoline-2,4-dione.
4. 3-heptamethyleneiminoquinazoline-2,4-dione.
5. 3-tetramethyleneiminoquinazoline-2,4-dione.

References Cited
UNITED STATES PATENTS 2,433,440 12/1947 Curd et al. _____ 260—256.4
3,235,360 2/1966 Soboczenski _____ 260—256.4

ALEX MAZEL, Primary Examiner
R. J. GALLAGHER, Assistant Examiner

U.S. Cl. X.R.
71—2.5; 260—239, 294.3, 326.3